2,827,382

PRESERVATION OF COLOR IN CANNED GREEN VEGETABLES

George J. Malecki, Wellesley Hills, Mass., assignor to Patent Protection Corporation, New York, N. Y., a corporation of New York, as trustee No Drawing. Application November 6, 1953
Serial No. 390,721

5 Claims. (Cl. 99—186)

The present invention relates to the preservation of the color of canned green vegetables, and consists in the utilization of a slightly alkaline canning medium containing a dibasic salt of glutamic acid.

It is well known that the color of canned green vegetables may be preserved by maintaining them under slightly alkaline conditions in the can, and numerous means for accomplishing this have been suggested.

In general these include, singly or in combination, pre-canning treatments designed to create an alkaline reserve in the vegetables, and the addition of alkalizing agents to the brine in which the vegetables are canned. The object of these treatments is not only to bring the pH to the proper value, but also to establish conditions tending to maintain the pH and counteract the increase in acidity normally attending the sterilization, cooking and storage of the canned vegetables.

Alkalizing agents suitable for addition to the canning medium accordingly should be of a nature to impart and maintain the desired alkalinity, and should in addition not adversely affect either the texture or flavor of the vegetables. Texture is particularly sensitive to the ionic content of the canning medium. Calcium ions, for instance, cause the skins of vegetables such as peas to toughen, whereas magnesium ions have a general texture hardening effect. Magnesium salts, however, can only be used in limited concentration since they tend to cause the formation of hard vitreous crystals of struvite (magnesium ammonium phosphate). Thus, alkalizing agents which are compounds of calcium or magnesium may not be used in unlimited quantities, and alkalizing agents containing calcium or magnesium may not ordinarily be used in the quantity producing the ultimate color preserving conditions.

The pH of the canning medium should be in the neighborhood of 8.0–8.5 after canning and as has been pointed out, the alkalizing agent should be such as to maintain this value against acidifying changes in the vegetables after canning. According to the present invention the proper pH is imparted and maintained by utilizing an alkaline canning medium containing a dibasic alkali metal or alkaline earth metal salt of glutamic acid. These are salts of a strong base and moderately weak acid, and are accordingly alkaline in nature, and their solutions contain a sufficient reserve of (di) glutamate anions to combine with and remove hydrogen ions formed during processing and storage, through the formation of undissociated glutamic acid. The principles involved may readily be appreciated from the mass action equations.

(1) $Na_2Gl \rightarrow 2Na^+ + Gl^=$
(2) $2H_2O + Gl^= \rightleftharpoons H_2Gl + 2OH^-$
(3) $Gl^= + 2H^+ \rightleftharpoons H_2Gl$ where $Gl^=$ represents dibasic glutamate. Equation 1 shows the substantially complete dissociation of di-sodium glutamate. Equation 2 shows the alkalizing effect of an aqueous solution of dibasic glutamate resulting from hydrolysis whereby hydroxyl ($OH^-$) ions are formed.

From Equation 3 it will be seen that hydrogen ions ($H^+$) are at least in part removed from solution by the formation of glutamic acid ($H_2Gl$).

Dibasic alkali metal or alkaline earth metal salts of glutamic acid are particularly suitable as alkalizing agents because the ionization constant for glutamic acid is such that the reactions of both Equations 2 and 3 may proceed with substantial effect. If the ionization constant of the acid component of an alkalizing salt is too high, the acid component remains so highly dissociated that neither hydrolysis (represented by Equation 2) nor hydrogen ion removal (represented by Equation 3) can occur. If the ionization constant is too low, on the other hand, the alkalizing agent becomes so highly hydrolysed that insufficient of its undissociated anions are available to combine with hydrogen ions formed after canning. The dibasic salt of glutamic acid, which has an ionization constant for its first hydrogen ion represented by a $pK_1$ of 2.10 and an ionization constant for its second hydrogen ion represented by a $pK_2$ of 4.07, produce the desired alkalinity with a reserve of undissociated diglutamate ions sufficient to remove substantial amounts of hydrogen ions after canning. In addition they have a beneficial effect on the flavor. For texture control the calcium and magnesium salts may be utilized in conjunction with the sodium or potassium salts to maintain a calcium-magnesium balance productive of the desired texture, this being largely a matter of discretion with the canner, while as much total salt as may be required for optimum alkalizing effect may be used.

In carrying out this invention, the dibasic alkali metal or alkaline earth metal salt of glutamic acid is added to a conventional canning brine with additional alkali to bring the pH after canning to about 8.5, and the vegetables are canned in the conventional manner. The amount of dibasic glutamate added may be as much as 0.02 mole per 100 grams of brine, but amounts in the range of 0.0015 to .004 mole per 100 grams of brine have been found entirely satisfactory and less costly. The major part of the glutamate is preferably the disodium salts with minor amounts of the calcium and magnesium salts as desired for texture control.

In a typical procedure there is added to a brine consisting for example, of an aqueous solution containing 4.5 percent by weight of sucrose and 2.5 percent by weight of sodium chloride, between 0.3 and 0.8 percent by weight of disodium glutamate, and a N/10 solution of sodium hydroxide is added to bring the pH to about 8.5 after processing in the cans.

This solution is then added to the vegetables to be canned, the cans filled with the vegetables and solution, and the cans are thereafter sealed and sterilized in the conventional manner, generally by cooking at 240–260° F. for 8–35 minutes depending on the sterilizing temperature.

For texture control, part of the disodium glutamate may advantageously be replaced by dicalcium glutamate. Advantageous results have been obtained by replacing between one-tenth and one-third of the sodium salt with the calcium salt, the larger amounts of calcium salt being particularly suitable when the sodium salt is present in amounts over 1% by weight. The dimagnesium salt may also be used with similar effect, but without the skin-toughening effect of calcium.

Alternatively, the calcium or magnesium content may be imparted as desired by utilizing calcium hydroxide or magnesium hydroxide as at least part of the base to bring the pH up to the desired value of about 8.5, the amount being added depending on the desired degree of hardening or skin-toughening. In this connection, it will be understood that although sodium hydroxide is suggested above as the material useful to adjust the pH of the brine, other basic materials, soluble in water and suitable for human consumption, e. g. potassium hydroxide or the carbonates and bicarbonates of sodium or potassium, may be used.

A further improvement in color preserving properties may be realized by the addition of water-soluble reducing agents to the brine. It is believed that at least part of the acidifying effect of storage of canned vegetables is due to oxidation, which accounts for the color stabilization effect of such reducing agents. Particularly suitable reducing agents are the water-soluble alkali metal and alkaline earth metal salts of ascorbic acid, e. g. sodium ascorbate, and phosphorous acid, e. g. calcium phosphite. These agents are advantageously added in an amount of 0.05–.10% of the weight of the brine, preferably in conjunction with diglutamate salts, although it is contemplated that the reducing agents alone are effective to stabilize the canning medium against acidification during processing and storage, and the can is then evacuated of oxygen and sealed.

Having thus disclosed my invention and described in detail preferred embodiments thereof, I claim and desire to secure by Letters Patent:

1. The process of preserving the color in canned green vegetables comprising adding to the liquid in which the vegetables are to be canned, a color stabilizing agent selected from the group consisting of the dibasic alkali metal and alkaline earth metal salts of glutamic acid and adding a base in an amount to bring the pH after canning to between about 8.0 and 8.5.

2. The process defined by claim 1 wherein the color stabilizing agent is disodium glutamate.

3. The process defined by claim 1 wherein the color stabilizing agent is added to the liquid in an amount of between about .0015 and 0.02 mole per 100 grams of liquid.

4. The process defined by claim 1 wherein there is also added to the liquid in which the vegetables are to be canned a reducing agent selected from the group consisting of the alkali metal and alkaline earth metal salts of ascorbic acid and phosphorous acid.

5. The process of claim 4 wherein the reducing agent is added in an amount of 0.05 to .10% of the weight of the liquid.

References Cited in the file of this patent
UNITED STATES PATENTS

| | | |
|---|---|---|
| 1,680,865 | Fujii | Aug. 14, 1928 |
| 2,553,533 | Komarik et al. | May 15, 1951 |
| 2,589,037 | Bendix et al. | Mar. 11, 1952 |

OTHER REFERENCES

"Food Packer," July 1948, page 30, article entitled "Monosodium Glutamate."

"Effect of Monosodium Glutamate on Taste of Pure Sucrose and Sodium Chloride" by Lockhart et al., pages 459 to 464, inclusive.